(12) United States Patent
Maria et al.

(10) Patent No.: US 11,899,228 B2
(45) Date of Patent: Feb. 13, 2024

(54) PROCESS FOR OBTAINING A DECORATIVE MIRROR

(71) Applicant: SAINT-GOBAIN GLASS FRANCE, Courbevoie (FR)

(72) Inventors: Juliette Maria, Compiègne (FR); Alexia Yon, Chantilly (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 22 days.

(21) Appl. No.: 17/262,951

(22) PCT Filed: Jul. 12, 2019

(86) PCT No.: PCT/EP2019/068864
§ 371 (c)(1),
(2) Date: Jan. 25, 2021

(87) PCT Pub. No.: WO2020/020671
PCT Pub. Date: Jan. 30, 2020

(65) Prior Publication Data
US 2021/0165140 A1    Jun. 3, 2021

(30) Foreign Application Priority Data
Jul. 26, 2018 (FR) ...................... 1856944

(51) Int. Cl.
G02B 5/08 (2006.01)
C03C 17/36 (2006.01)
G02B 5/28 (2006.01)

(52) U.S. Cl.
CPC ........ *G02B 5/0875* (2013.01); *C03C 17/3626* (2013.01); *C03C 17/3649* (2013.01); *C03C 17/3663* (2013.01); *C03C 17/3684* (2013.01); *G02B 5/0825* (2013.01); *G02B 5/285* (2013.01); *C03C 2217/26* (2013.01); *C03C 2217/281* (2013.01); *C03C 2217/78* (2013.01); *C03C 2218/119* (2013.01); *C03C 2218/156* (2013.01); *C03C 2218/31* (2013.01); *C03C 2218/328* (2013.01)

(58) Field of Classification Search
CPC .................. C03C 2218/33; C03C 17/3663
See application file for complete search history.

(56) References Cited

U.S. PATENT DOCUMENTS

| | | | |
|---|---|---|---|
| 2,036,021 A * | 3/1936 | Cheney | C03C 17/06 216/48 |
| 3,152,948 A | 10/1964 | Bernard et al. | |
| 6,086,210 A * | 7/2000 | Krisko | C03C 17/361 359/838 |
| 6,379,569 B1 * | 4/2002 | Rouberol | C03C 17/23 216/13 |
| 7,621,648 B2 | 11/2009 | Wuillaume et al. | |
| 2004/0137234 A1 * | 7/2004 | Stachowiak | C03C 17/3435 428/428 |
| 2008/0210298 A1 * | 9/2008 | Kuebelbeck | C03C 17/3411 252/79.2 |
| 2014/0227500 A1 * | 8/2014 | Vikor | G02B 5/0833 428/216 |

FOREIGN PATENT DOCUMENTS

| | | |
|---|---|---|
| BE | 1 002 215 A4 | 10/1990 |
| CN | 105417965 A | 3/2016 |
| DE | 40 22 745 A1 | 1/1991 |
| WO | WO 2013/002882 A1 | 1/2013 |
| WO | WO 2017/203123 A1 | 11/2017 |

OTHER PUBLICATIONS

International Search Report as issued in International Patent Application No. PCT/EP2019/068864, dated Sep. 26, 2019.

\* cited by examiner

*Primary Examiner* — Alex A Rolland
(74) *Attorney, Agent, or Firm* — Pillsbury Winthrop Shaw Pittman LLP

(57) ABSTRACT

A process for obtaining a decorative mirror includes reflective regions forming a pattern and non-reflective regions, the process including providing a sheet of soda-lime-silica glass coated with a reflective coating on the entirety of one of the faces thereof, then applying a composition including a phosphate salt to the reflective coating, solely in application regions, the application regions being intended to become the non-reflective regions, then tempering the glass sheet, in which the glass sheet is subjected to a temperature of at least 550° C., causing the reflective coating to dissolve in the application regions so as to form the non-reflective regions in which the glass sheet is not coated.

12 Claims, No Drawings

PROCESS FOR OBTAINING A DECORATIVE MIRROR

CROSS-REFERENCE TO RELATED APPLICATIONS

This application is the U.S. National Stage of PCT/EP2019/068864, filed Jul. 12, 2019, which in turn claims priority to French patent application number 1856944 filed Jul. 26, 2018. The content of these applications are incorporated herein by reference in their entireties.

The invention relates to the field of decorative mirrors. It more particularly relates to the obtainment of what are referred to as "partial" mirrors, comprising reflective regions forming a pattern and non-reflective regions. Mirrors generally comprise glass sheets coated with a reflective coating. By "reflective region" what is meant in the present text is a region that has, coating side, a light reflectance as defined in standard EN 410 of at least 25%, in particular of at least 40%, or even of at least 50%. The light transmittance of the reflective region, again as defined in standard EN 410, is generally at most 70%, preferably at most 20%, or even at most 15% or 10%. A "non-reflective region" is a region having a light reflectance of at most 20%, in particular of at most 15%, or even of at most 10%. It is generally a question of a region in which the glass is not coated, and which therefore has a light transmittance generally much higher than its light reflectance. Such decorative mirrors may for example be used in architecture, interior design, electrical appliances, etc.

Another requirement that has a bearing on mirrors relates to their mechanical strength. For reasons regarding human safety, it may be useful to increase the impact resistance of mirrors, while ensuring in case of breakage that the mirror shatters into fragments without sharp edges. To this end, the glass sheet may be thermally tempered, by heating it above its glass transition temperature then cooling it rapidly so as to create, on the surface of the glass, compressive stresses. The reflective coating may be deposited after the temper; however, as tempered glass can no longer be cut, this requires depositing steps to be carried out after cutting, and therefore on glass sheets of very varied sizes, this being disadvantageous from an economical point of view. Alternatively, the reflective coating is deposited before the temper, on standard substrates of very large size, which are cut to the desired dimensions, before the tempering step. This alternative is more advantageous economically and industrially speaking, but requires reflective coatings that are able to resist temperatures above 500° C. or even 600° C. to be developed.

In the context of this second alternative, the production of partial mirrors poses difficulties. Partial mirrors are often produced in small batches, because the dimensions and designs desired by customers are very varied. It is therefore not economically envisionable—even though it is technically possible, for example using masks—to deposit the reflective coating only on certain regions of a substrate of large size, in particular when the coating is deposited by magnetron cathode sputtering. Solutions such as laser ablation have been envisioned, but they are very expensive.

The aim of the invention is therefore to provide an economical process for fabricating partial mirrors of high mechanical strength.

To this end, one subject of the invention is a process for obtaining a decorative mirror comprising reflective regions forming a pattern and non-reflective regions, said process comprising the following steps:

- providing a sheet of soda-lime-silica glass coated with a reflective coating on the entirety of one of the faces thereof, then
- a step of applying a composition comprising a phosphate salt to said reflective coating, solely in application regions, said application regions being intended to become the non-reflective regions, then
- a step of tempering said glass sheet, in which said glass sheet is subjected to a temperature of at least 550° C., causing the reflective coating to dissolve in the application regions so as to form said non-reflective regions in which the glass sheet is not coated.

Another subject of the invention is a decorative mirror comprising reflective regions forming a pattern and non-reflective regions, said mirror being capable of being obtained using the process according to the invention. The mirror comprises a sheet of soda-lime-silica glass that is not coated in said non-reflective regions and that is coated with a reflective coating in said reflective regions.

Another subject of the invention is an intermediate product intended to form a decorative mirror comprising reflective regions forming a pattern and non-reflective regions, said intermediate product comprising a sheet of soda-lime-silica glass coated on the entirety of one of the faces thereof with a reflective coating, said reflective coating being coated in certain regions with a composition comprising a phosphate salt.

The process according to the invention easily allows partial mirrors to be obtained at a low cost since it merely involves adding a step of selectively applying a composition containing a phosphate salt. During the temper, the latter completely dissolves the underlying reflective stack so that, in the regions where the composition was applied, only bare glass remains.

The glass sheet is preferably planar. The thickness of the glass sheet is preferably comprised in a range extending from 1 to 19 mm, in particular from 2 to 12 mm and even from 3 to 9 mm. Preferably, the glass sheet has at least one dimension larger than 50 cm, and in particular than 1 m.

The glass sheet is preferably obtained using the float process, in which process molten glass is poured onto a bath of molten tin. The glass is preferably colorless, but may be tinted, for example blue, green, gray, bronze, etc.

The soda-lime-silica glass generally possesses a chemical composition by weight comprising 60 to 75% $SiO_2$, 10 to 20% $Na_2O$, 5 to 15% $CaO$, 0 to 10% $MgO$ and 0 to 5% $Al_2O_3$.

According to one preferred embodiment, the reflective coating comprises at least one functional layer. It may comprise a single one thereof, or a plurality thereof, two for example, which may be identical or different. By functional layer what is meant is a layer capable of giving, optionally in combination with other layers of said coating, the coating the reflective and transmissive properties that make it a reflective coating as understood in the context of the invention.

At least one functional layer, in particular the or each functional layer, is preferably a metal layer or a layer of a metal nitride.

The or each metal layer is preferably based on chromium or niobium. The or each layer of a metal nitride is preferably a layer of niobium nitride or based on such a nitride.

When the metal layer is based on chromium, it is advantageously a question of a layer comprising at least 45% by weight chromium. The content by weight of chromium is preferably at least 50%, in particular at least 55%, and even at least 60% or at least 70%, or indeed at least 80% or at least 90%. The metal layer may consist of chromium. Alternatively, the metal layer may be an alloy of chromium and of at least one other element, in particular chosen from Al and/or Si. Mention may in particular be made of CrAl alloys containing 75 to 80% by weight chromium, of CrSi alloys containing 45 to 85% by weight chromium, and of CrAlSi alloys containing 70 to 80% by weight chromium. Such materials have both a high light reflectance and a high resistance to tempering. The or each layer based on chromium preferably possesses a physical thickness ranging from 10 to 60 nm, and in particular from 20 to 40 nm.

When the metal layer is based on niobium, it is advantageously a question of a niobium layer. It preferably possesses a physical thickness ranging from 5 to 50 nm, and in particular from 8 to 40 nm.

When the functional layer is made of niobium nitride, it preferably possesses a physical thickness ranging from 5 to 50 nm, and in particular from 8 to 40 nm.

In order to avoid any change in appearance related to the temper, the reflective coating is preferably a stack of thin layers, in which stack the or each, in particular metal, functional layer is flanked by two protective layers made of oxides, nitrides or oxynitrides, in particular of silicon or aluminum. Nitrides and oxynitrides are preferred, and silicon nitride has proved to be particularly effective at protecting the functional, in particular metal, layer during the temper.

The physical thickness of each protective layer is preferably comprised in a range extending from 2 to 50 nm, and in particular from 5 to 40 nm. When the metal layer is based on chromium, a layer made of titanium or silicon having a thickness ranging from 1 to 5 nm is advantageously deposited by way of last layer of the stack. When the functional layer is made of metal nitride, and in particular made of niobium nitride, a metal layer, in particular made of titanium, having a thickness ranging from 1 to 5 nm, is advantageously deposited directly on and/or under the functional layer.

A preferred reflective coating comprises a first layer of silicon nitride, then a layer of chromium or niobium, or even of niobium nitride, then a second layer of silicon nitride.

According to another embodiment, the reflective coating is an alternating stack of thin high-refractive-index dielectric layers and of thin low-refractive-index dielectric layers. The optical thicknesses of the layers are then chosen to maximize reflectance by creating constructive interference. The stack may in particular comprise in succession, starting from the glass sheet, a first thin layer based on titanium oxide, a thin layer based on silicon oxide, then a second thin layer based on titanium oxide. The titanium oxide may be replaced by a solid solution of titanium oxide and of an oxide of another metal, zirconium for example.

The physical thickness of the reflective coating is preferably at most 250 nm.

The reflective coating is preferably deposited by cathode sputtering, and in particular magnetron sputtering. Other processes are envisionable, in particular chemical-vapor-deposition (CVD) processes. Typically, the deposition will be carried out beforehand on a substrate of large size, from which substrate the glass sheet is obtained by cutting. The process according to the invention may therefore comprise a step of depositing the reflective coating on the entirety of one face of a substrate of soda-lime-silica glass, then a step of cutting said substrate in order to obtain the coated glass sheet that serves in the following steps of the process. The step of depositing the reflective coating will however generally be carried out on a different site, optionally by another manufacturer, to the subsequent steps of cutting, of applying the composition comprising the phosphate salt and of tempering.

The phosphate salt is preferably an ammonium phosphate or an alkali-metal phosphate, and in particular a sodium phosphate. The term "phosphate" is understood to mean as well hydrogen phosphates and dihydrogen phosphates. The generic term sodium phosphate therefore covers sodium hydrogen phosphate $Na_2HPO_4$, sodium dihydrogen phosphate $NaH_2PO_4$, trisodium phosphate $Na_3PO_4$, and mixtures of these compounds.

The composition comprising the phosphate salt preferably comprises an, in particular organic, solvent and a resin. The amounts of solvent and of resin allow the viscosity of the composition to be regulated, and are to be chosen depending on the application process used.

The resin also allows a temporary layer that has both a sufficient adhesion to the glass sheet and good mechanical properties to be formed. Specifically, a certain mechanical strength is beneficial in order to prevent this temporary layer from being damaged before the tempering step, for example during transportation between the workshop in which the composition is applied and the workshop in which the temper is applied. This is particularly appreciable when the two workshops are not located in the same factory; however, even in the contrary case, the glass sheet generally passes over conveyors that are liable to damage the temporary layer. The resin and the solvent are removed later on during the tempering step. The resins and solvents conventionally used in enamel compositions have proved to be very suitable.

The applying step is preferably carried out by screen-printing. The screen-printing comprises depositing, in particular using a squeegee, a pasty liquid on the glass sheet through the mesh of a screen-printing screen. The mesh of the screen is blocked, in the portions corresponding to the regions of the glass sheet that it is desired not to coat, so that the paste can pass through the screen only in the regions to be printed, in a predefined pattern. The pattern to be printed here corresponds to the negative of the final reflective pattern.

The applying step may be carried out using other techniques, for example sputtering, roll coating or curtain coating, using a mask in order to perform the application only in the application regions. An application by roll coating is also envisionable even in the absence of mask when the decoration is sufficiently simple, such as for example a peripheral region, in order to produce a marie-louise. Digital printing processes and in particular inkjet printing are other possible applying techniques.

The applying step is preferably followed by a drying step. The drying allows, where appropriate, at least some of the solvent to be removed and/or the resin to be at least partially cross-linked. The drying temperature is typically comprised between 100 and 250° C., and in particular between 120 and 200° C. A drying step employing infrared radiation is for example suitable.

In the tempering step, the glass sheet is subjected to a temperature preferably of at least 600° C., in particular of at least 620° C. and/or of at most 750° C., and in particular of at most 725° C. or of at most 700° C. The glass sheet is then subjected to rapid cooling, for example by means of jets of air.

Preferably, the process furthermore comprises, after the tempering step, a cleaning step. Specifically, after the tempering a deposit in gel form remains, which is easily removed for example via spraying with water or immersion in water.

In the obtained mirror, the light reflectance of the reflective regions, on the side of the reflective coating, is preferably at least 25%, in particular at least 40%, or even at least 50%. The light reflectance is generally at most 90%. It is preferably a question of specular reflection and not of diffuse reflection. The light reflectance of the non-reflective regions corresponds to that of the bare glass; it is therefore preferably about 6 to 10%, and in particular about 8%. The light transmittance of the non-reflective regions is preferably at least 80%, in particular 85%, or even 89%, and generally at most 92%. The light transmittance of the reflective regions is preferably at most 70%, in particular at most 30% or 25%, or even at most 20% or 15%, or even at most 10%. It is typically at least 1% or at least 5%. It is in particular possible to distinguish between very reflective coatings, having a light reflectance between 40% and 90%, and in particular between 50% and 80%, and a light transmittance between 1 and 25%, and in particular between 2 and 20%, or even between 3 and 15%, and coatings of average reflectance, having a light reflectance between 25% and 35% and a light transmittance between 40 and 70%. The latter create a mirror effect under certain illumination conditions.

The reflective regions preferably occupy from 10 to 90%, and in particular from 20 to 80%, of the area of the glass sheet.

The pattern formed by the reflective regions and/or the non-reflective regions may be of any sort because there is no technical limitation thereon. It may for example be a question of a geometric pattern, whether periodic or not, of the reproduction of an image, of a logo, etc.

The mirror may be used in many applications, both indoors and outdoors: interior doors and partitions, shower and bath screens, store fixture or fittings, salon fixture or fittings, room fixture or fittings, showroom fixture or fittings, facade claddings, parts of electrical appliances such as for example oven doors, etc.

An oven door may thus comprise, by way of pane closest to the user, a decorative mirror according to the invention, for example comprising a reflective region taking the form of a peripheral frame having a metallic appearance, and a central non-reflective portion allowing the user to see inside the oven.

The following examples illustrate the invention non-limitingly.

EXAMPLE 1

A sheet of clear soda-lime-silica glass was obtained by cutting a glass substrate coated beforehand by cathode sputtering with a reflective stack, sold under the reference SGG Mirastar.

The reflective stack used consisted in a succession, starting from the glass, of a first layer of silicon nitride, of a layer of chromium, then of a second layer of silicon nitride.

To this coated glass sheet was applied, by screen-printing, a composition comprising sodium phosphate and a resin, in decorative geometric patterns. The application allowed a temporary layer having a wet thickness (before drying) of about 25 µm to be obtained.

The glass sheet thus coated was then subjected to a thermal tempering treatment involving heating to 650-680° C. for 180 seconds in a tempering furnace.

After tempering, the regions of application of the phosphate salt were covered with a gel that could be removed by simply wiping with a damp cloth. In these regions, the reflective coating completely disappeared, causing bare, and therefore transparent, glass to appear. In the adjacent regions in contrast, which were not covered with the phosphate salt, the reflective coating remained present.

The obtained mirror therefore comprised reflective regions and non-reflective regions forming patterns, the separation between the regions furthermore being very clear. The light reflectance coating-side of the reflective regions was 60%, and the light transmittance 3%.

EXAMPLE 2

Example 2 differs from Example 1 only in the nature of the reflective stack, here the stack sold by the Applicant under the reference SGG Cool-Lite ST108. This stack consists of a succession, starting from a clear glass substrate, of a first layer of silicon nitride, of a layer of niobium, then of a second layer of silicon nitride.

Results of the same nature as those of Example 1 were obtained. The light reflectance coating-side of the reflective regions was 44%, and the light transmittance 9%.

EXAMPLE 3

Example 3 also differs from Example 1 in the nature of the reflective stack, in the present case the stack sold by the Applicant under the reference Cool-Lite ST Bright Silver.

In this example, the reflective coating is an alternating stack of thin high-refractive-index dielectric layers and of thin low-refractive-index dielectric layers. More precisely, this stack comprises a layer of titanium oxide (high index), then a layer of silica (low index) and lastly a layer based on titanium oxide (high index).

Results of the same nature as those of Example 1 were obtained. The light reflectance coating-side of the reflective regions was 31%, and the light transmittance 67%.

The invention claimed is:
1. A process for obtaining a decorative mirror comprising reflective regions forming a pattern and non-reflective regions, said process comprising:
   providing a sheet of soda-lime-silica glass coated with a reflective coating on the entirety of one of the faces thereof, then
   applying a composition comprising a phosphate salt to said reflective coating coated on the glass sheet, solely in application regions, said application regions being intended to become the non-reflective regions, then
   after applying said composition, tempering said glass sheet in a tempering furnace, in which said glass sheet is subjected to a temperature of at least 550° C., said composition comprising a phosphate salt completely dissolving the reflective coating in the application regions during said tempering in the tempering furnace so as to form, after said tempering, said non-reflective regions in which the glass sheet is not coated and a tempered glass sheet comprising said reflective regions and said non-reflective regions,
   wherein the reflective coating comprises at least one functional layer that is a metal layer or a layer of a metal nitride, or
   wherein the reflective coating is an alternating stack of thin high-refractive-index dielectric layers and of thin low-refractive-index dielectric layers.
2. The process as claimed in claim 1, wherein the metal layer is based on chromium or niobium.

3. The process as claimed in claim 1, wherein the layer of a metal nitride is a layer of niobium nitride.

4. The process as claimed in claim 1, wherein the reflective coating is a stack of thin layers, in which stack the or each functional layer is flanked by two protective layers made of oxides, nitrides or oxynitrides.

5. The process as claimed in claim 4, wherein the two protective layers are made of oxides, nitrides or oxynitrides of silicon or aluminum.

6. The process as claimed in claim 1, wherein the reflective coating is deposited by cathode sputtering.

7. The process as claimed in claim 1, wherein the phosphate salt is an ammonium phosphate or an alkali-metal phosphate.

8. The process as claimed in claim 7, wherein the phosphate salt is a sodium phosphate.

9. The process as claimed in claim 1, wherein the composition comprising the phosphate salt comprises a solvent and a resin.

10. The process as claimed in claim 9, wherein the solvent is an organic solvent.

11. The process as claimed in claim 1, wherein the applying is carried out by screen-printing.

12. The process as claimed in claim 1, furthermore comprising, after the tempering, a cleaning step.

* * * * *